(12) United States Patent
Aizawa et al.

(10) Patent No.: US 8,122,766 B2
(45) Date of Patent: Feb. 28, 2012

(54) INERTIA FORCE SENSOR

(75) Inventors: Hiroyuki Aizawa, Osaka (JP); Satoshi Ohuchi, Hyogo (JP)

(73) Assignee: Panasonic Corporation, Osaka (JP)

( * ) Notice: Subject to any disclaimer, the term of this patent is extended or adjusted under 35 U.S.C. 154(b) by 739 days.

(21) Appl. No.: 12/294,478

(22) PCT Filed: Mar. 26, 2007

(86) PCT No.: PCT/JP2007/056152
§ 371 (c)(1),
(2), (4) Date: Sep. 25, 2008

(87) PCT Pub. No.: WO2007/111289
PCT Pub. Date: Apr. 10, 2007

(65) Prior Publication Data
US 2010/0229645 A1    Sep. 16, 2010

(30) Foreign Application Priority Data
Mar. 27, 2006  (JP) .................. 2006-084579

(51) Int. Cl.
*G01C 19/00* (2006.01)
(52) U.S. Cl. .................. 73/504.12; 73/504.16
(58) Field of Classification Search .............. 73/504.02, 73/504.03, 504.04, 504.12, 504.14, 504.16
See application file for complete search history.

(56) References Cited

U.S. PATENT DOCUMENTS
7,188,525 B2 *  3/2007  Machida et al. .......... 73/504.16

FOREIGN PATENT DOCUMENTS

| EP | 1302744 A2 | 4/2003 |
|---|---|---|
| JP | 9-178492 | 7/1997 |
| JP | 09178492 A | 7/1997 |
| JP | 09178492 | * 11/1997 |
| JP | 09-329444 | 12/1997 |
| JP | 11-248465 | 9/1999 |
| JP | 2001-074767 | 3/2001 |
| JP | 2001-82963 | 3/2001 |
| JP | 01082963 | * 3/2001 |
| JP | 2001082963 A | 3/2001 |
| JP | 2001-208546 | 8/2001 |
| JP | 2003-185441 | 7/2003 |

OTHER PUBLICATIONS

Supplemental European Search Report for Appl. Serial No. EP 07739591 dated Feb. 8, 2010.
International Search Report for PCT/JP2007/056152; Apr. 13, 2007.

* cited by examiner

*Primary Examiner* — Hezron E Williams
*Assistant Examiner* — Hoang Nguyen
(74) *Attorney, Agent, or Firm* — Pearne & Gordon LLP

(57) ABSTRACT

Inertial force sensor includes detecting element that detects inertial force. Detecting element includes: two first orthogonal arms each having first arm and second arm that are connected to each other in a substantially orthogonal direction; support portion that supports two first arms; fixing arms; and weights. Second arms include: bent portions; facing portions that are bent at bent portions so as to face second arms; driving electrodes that are formed in two facing portions facing each other, and drive and vibrate facing portions; and detection electrodes that are formed in the other two facing portions facing each other, and detect the distortion of facing portions. According to this structure, it is possible to achieve small inertial force sensor capable of detecting a plurality of different inertial forces and inertial forces acting on a plurality of detection axes.

6 Claims, 5 Drawing Sheets

INERTIA FORCE SENSOR

This application is a U.S. national phase application of PCT international application PCT/JP2007/056152, filed Mar. 26, 2007.

TECHNICAL FIELD

The present invention relates to an inertial force sensor for detecting inertial force, which is used to control an attitude of moving bodies, such as airplanes, cars, robots, ships, and vehicles, or is used for various electronic apparatuses, such as navigation apparatuses.

BACKGROUND ART

In recent years, inertial force sensors have been used to detect inertial forces, such as an angular velocity and acceleration. When the inertial force sensor according to the related art is used, a dedicated angular velocity sensor is used to detect an angular velocity, and a dedicated acceleration sensor is used to detect acceleration. In addition, a plurality of angular velocity sensors and acceleration sensors corresponding to the number of detection axes is used to detect an angular velocity and acceleration acting on a plurality of detection axes, such as the X-axis, the Y-axis, and the Z-axis that are orthogonal to one another.

Therefore, in various electronic apparatuses, when detecting both the angular velocity and the acceleration or when detecting angular velocities and accelerations for a plurality of detection axes, a plurality of angular velocity sensors and acceleration sensors is mounted on a mounting substrate of the electronic apparatus.

For example, a detecting element having various shapes, such as a tuning fork shape, an H shape, and a T shape, is vibrated so as to generate the Coriolis force. The angular velocity sensor electrically detects the distortion of the detecting element caused by the Coriolis force, thereby detecting an angular velocity. Further, for example, the acceleration sensor includes a weight, compares movements of the weight before and after acceleration, and detects a difference between the movements, thereby detecting the acceleration.

Various inertial force sensors according to the related art, such as the angular velocity sensor and the acceleration sensor, have been used for electronic stability control apparatuses of moving bodies, such as vehicles, or navigation apparatuses according to the inertial force or the detection axis of a detection target.

Such inertial force sensors are disclosed in, for example, Japanese Patent Unexamined Publication No. 2001-208546 (Patent Document 1) or Japanese Patent Unexamined Publication No. 2001-74767 (Patent Document 2).

[Patent Document 1] Japanese Patent Unexamined Publication No. 2001-208546

[Patent Document 2] Japanese Patent Unexamined Publication No. 2001-74767

SUMMARY OF THE INVENTION

An object of the invention is to provide a small inertial force sensor that does not require a large mounting area for mounting a plurality of inertial force sensors and is capable of detecting a plurality of different inertial forces, such as an angular velocity and acceleration, or inertial forces acting on a plurality of detection axes.

According to an aspect of the invention, an inertial force sensor includes a detecting element that detects inertial force. The detecting element includes two first orthogonal arms, a support portion, a fixing arm and a weight. The first orthogonal arm has a first arm and a second arm that are connected to each other in a substantially orthogonal direction. The support portion supports the two first arms. The fixing arm has one end to which a mounting substrate having the detecting element mounted thereon is fixed. The weight is formed at an end of the second arm. The second arms include: bent portions; facing portions that are bent at the bent portions so as to face the second arms; driving electrodes that are formed at two of the facing portions provided in the same direction with reference to the support portion, and drive and vibrate the facing portions; and detection electrodes that are formed at two facing portions which are opposite to the two facing portions having the driving electrodes with reference to the support portion, and detect the distortion of the facing portions. According to this structure, it is possible to provide a small inertial force sensor capable of detecting a plurality of different inertial forces and inertial forces acting on a plurality of detection axes.

REFERENCE MARKS IN THE DRAWINGS

1: DETECTING ELEMENT
2: FIRST ARM
4: SECOND ARM
4a: BENT PORTION
4b, 10b: END PORTION
6: SUPPORT PORTION
8: FIXING ARM
10: THIRD ARM
12: FIXING PORTION
14: WEIGHT
16: FACING PORTION
18: DRIVING ELECTRODE
20, 30: DETECTION ELECTRODE
22: FIRST DETECTION ELECTRODE
24: SECOND DETECTION ELECTRODE
26: THIRD DETECTION ELECTRODE
28: FOURTH DETECTION ELECTRODE
32: FIFTH DETECTION ELECTRODE
34: SIXTH DETECTION ELECTRODE
36: SEVENTH DETECTION ELECTRODE
38: EIGHTH DETECTION ELECTRODE
40: SILICON SUBSTRATE
42: THIN FILM RESISTOR
50: INERTIAL FORCE SENSOR
52: FIRST ORTHOGONAL ARM
54: SECOND ORTHOGONAL ARM
56, 58: SIGNAL LINE

DETAILED DESCRIPTION OF PREFERRED EMBODIMENTS

Figure 1:
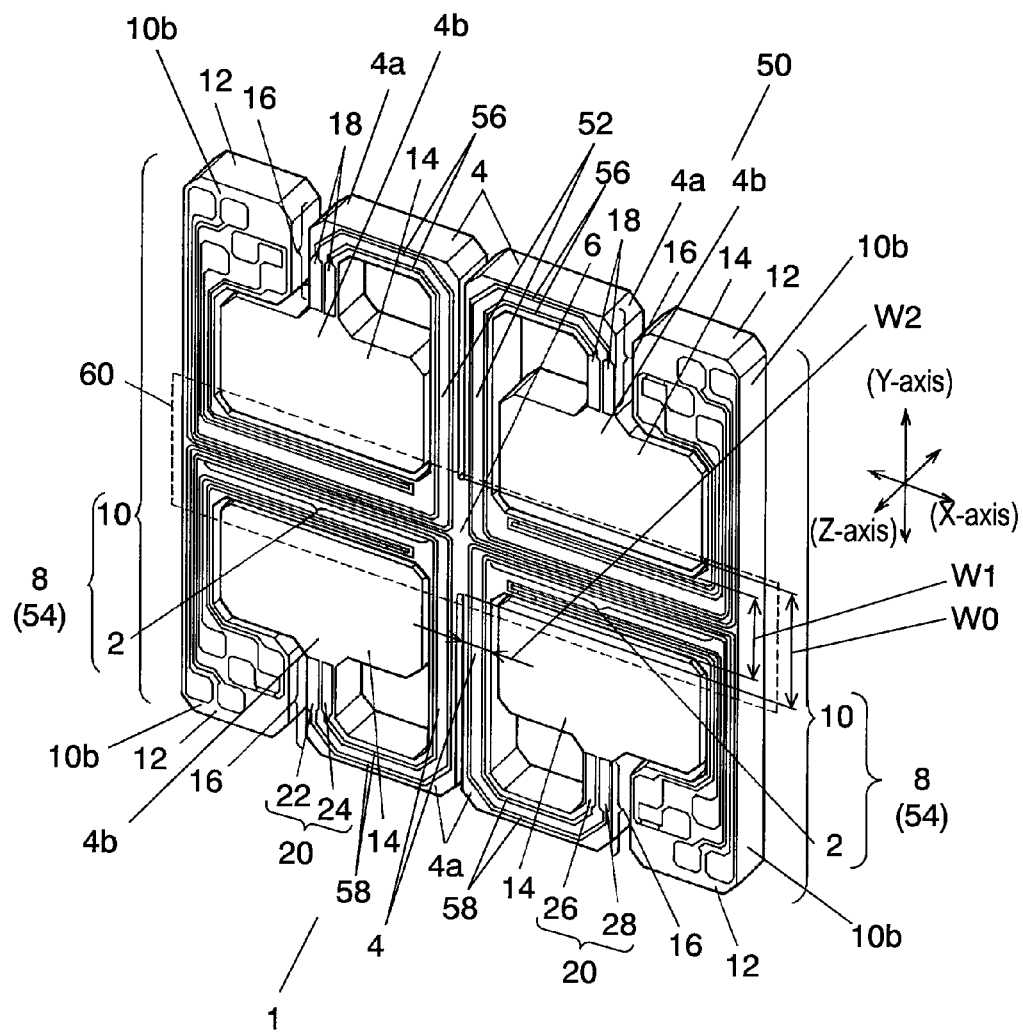
FIG. 1 is a perspective view illustrating a detecting element used in an inertial force sensor according to an embodiment of the invention.
Figure 2:
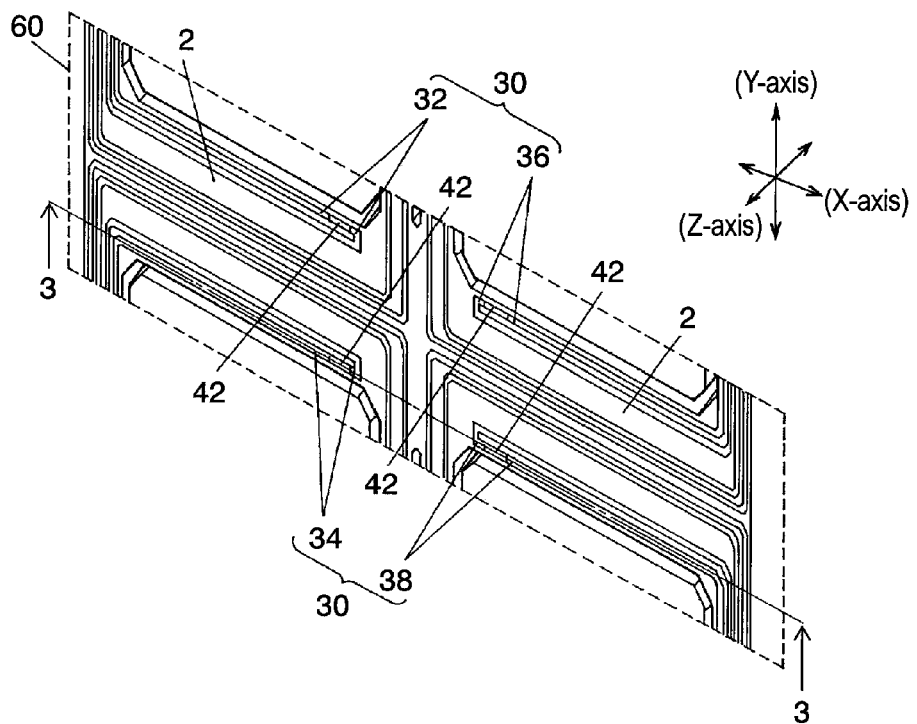
FIG. 2 is an enlarged view illustrating a main part of the detecting element shown in FIG. 1.
Figure 3:
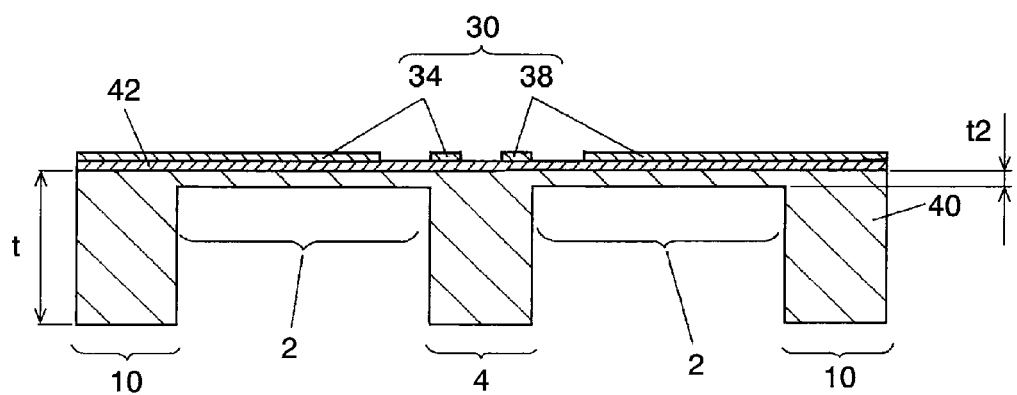
FIG. 3 is a cross-sectional view taken along a line 3-3 of the detecting element shown in FIG. 2.
Figure 4:
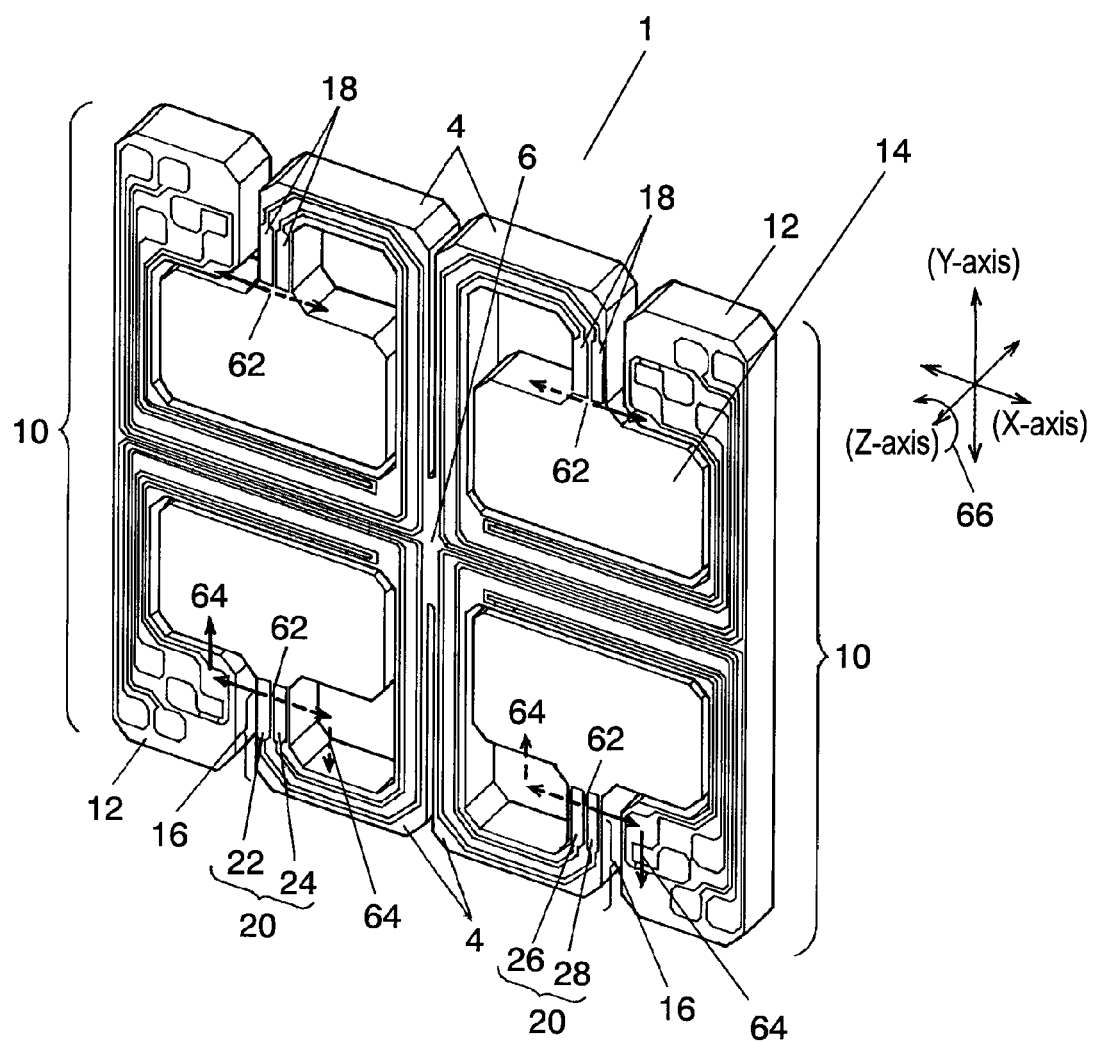
FIG. 4 is a diagram illustrating the operational state of the detecting element shown in FIG. 1.

FIG. 1 is a perspective view illustrating detecting element 1 of inertial force sensor 50 according to an embodiment of the invention. FIG. 2 is an enlarged view of portion 60 shown in FIG. 1, and FIG. 3 is a cross-sectional view taken along the line 3-3 of FIG. 2. FIG. 4 is a diagram illustrating the operational state of detecting element 1 shown in FIG. 1.

In FIGS. 1 to 3, inertial force sensor 50 includes detecting element 1 that detects inertial force and a processing circuit (not shown). Detecting element 1 includes two first orthogonal arms 52, support portion 6, and two fixing arms 8. Each of two first orthogonal arms 52, which are orthogonal arms, includes one first arm 2 and two second arms 4. First arm 2 is connected to second arm 4 in a substantially orthogonal direction.

Further, support portion 6 supports two first arms 2. In this way, two second arms 4 are arranged on the same straight line and connected to each other with support portion 6 interposed therebetween. Each of two fixing arms 8 is formed by connecting first arm 2 and third arm 10 so as to be substantially orthogonal to each other. In addition, fixing arm 8 also serves as second orthogonal arm 54 and forms an orthogonal arm. That is, first arm 2 serves as a part of fixing arm 8 and a part of first orthogonal arm 52. One end of fixing arm 8 is connected to support portion 6, and fixing portion 12 is formed at end portion 10b, which is the other end of fixing arm 8. That is, fixing portions 12 are formed at both ends 10b of third arm 10. In addition, fixing portions 12 are fixed to a mounting substrate (not shown) having detecting element 1 mounted thereon.

Each of second arms 4 is bent at bent portion 4a. Facing portion 16 facing second arm 4 of oneself is formed by bending second arm 4 at bent portion 4a. In addition, weight 14 is formed at end portion 4b of each of second arms 4. Facing portion 16 faces third arm 10 by bending second arm 4 at bent portion 4a.

In detecting element 1, two first arms 2 and support portion 6 are arranged on substantially the same straight line. In addition, the X-axis, the Y-axis, and the Z-axis are orthogonal to one another, the longitudinal direction of first arm 2 is aligned with the X-axis, and the longitudinal direction of second arm 4 is aligned with the Y-axis.

The term 'substantially orthogonal' means that the arms intersect each other at an angle of 89° to 91°, preferably, 89.5° to 90.5°, more preferably, 89.9° to 90.1°. The term 'arranged on substantially the same straight line' means that two first arms 2 are connected to each other at support portion 6 at an angle of 179° to 181°, preferably, 179.5° to 180.5°, more preferably, 179.9° to 180.9°.

Among four second arms 4, driving electrodes 18 are provided at two facing portions 16 that are arranged at one side of second arms 4 facing each other. In addition, detection electrodes 20 are provided at two facing portions 16 that are arranged at the other side of second arms 4 facing each other. That is, driving electrodes 18 are formed at two of facing portions 16 that are provided at second arms 4 arranged at the same direction with reference to support portion 6 in the longitudinal direction of second arms 4. Similarly, detection electrodes 20 are formed at two of facing portions 16 that are provided at second arms 4 arranged at an opposite direction to two facing portions 16 having driving electrodes 18 with reference to support portion 6.

Driving electrode 18 vibrates facing portion 16 in a direction in which the facing portion faces second arm 4, and detection electrode 20 detects the distortion of facing portion 16 in the facing direction. That is, driving electrode 18 vibrates facing portion 16 in a direction that is substantially orthogonal to the longitudinal direction of second arm 4, and detection electrode 20 detects the distortion of facing portion 16 in the direction that is substantially orthogonal to the longitudinal direction of second arm 4. Detection electrodes 20 are angular velocity detection electrodes for detecting an angular velocity, and denote first detection electrode 22, second detection electrode 24, third detection electrode 26, or fourth detection electrode 28. First detection electrode 22 and second detection electrode 24 are provided in one of two facing portions 16 having detection electrodes 20 provided therein such that electrode 22 and electrode 24 face each other. Third detection electrode 26 and fourth detection electrode 28 are provided in the other one of two facing portions 16 having detection electrodes 20 provided therein such that electrode 26 and electrode 28 face each other.

For example, driving electrode 18 and detection electrode 20 are formed by laminating a lower electrode, a piezoelectric body, and an upper electrode on silicon substrate 40. For example, the lower electrode is formed by performing high-frequency sputtering on Pt. In addition, for example, the piezoelectric body is obtained by forming a PZT piezoelectric material on an upper surface of the lower electrode by high-frequency sputtering. Further, for example, the upper electrode is formed by depositing Au on an upper surface of the piezoelectric body by vapor deposition.

When an AC voltage having the resonant frequency of silicon substrate 40 forming detecting element 1 is applied between the lower electrode and the upper electrode, facing portion 16 having driving electrode 18 provided therein is vibrated. Then, all of four second arms 4 and four facing portions 16 are vibrated in synchronization with the vibration of facing portions 16. When second arms 4 are distorted due to an angular velocity, a voltage corresponding to the distortion is output from detection electrodes 20 of distorted second arms 4. The processing circuit detects an angular velocity on the basis of the voltage output from detection electrodes 20.

Furthermore, as shown in FIG. 2, first arm 2 is provided with detection electrodes 30 that detect the distortion of first arm 2. Detection electrodes 30 are acceleration detection electrodes for detecting acceleration, and denote fifth detection electrode 32, sixth detection electrode 34, seventh detection electrode 36, or eighth detection electrode 38. Fifth detection electrode 32 and sixth detection electrode 34 are arranged in one of first arms 2 so as to face each other in a direction that is orthogonal to the longitudinal direction of first arm 2. In addition, seventh detection electrode 36 and eighth detection electrode 38 are arranged in the other one of first arms 2 so as to face each other in the direction that is orthogonal to the longitudinal direction of first arm 2.

As shown in FIG. 3, thin film resistors 42 are laminated on silicon substrate 40. In addition, detection electrode 30 is formed on thin film resistor 42. In this way, when first arm 2 is distorted due to acceleration, a voltage corresponding to the distortion is output from detection electrode 30 provided in distorted first arm 2. The processing circuit detects the acceleration on the basis of the voltage output from detection electrode 30.

According to the above-mentioned structure, for example, as shown in FIG. 4, when facing portion 16 of second arm 4 is vibrated due to acceleration in the X-axis direction (direction of an arrow 62), which is the facing direction, distortion occurs in the X-axis direction of facing portion 16 of second arm 4 due to an angular velocity about the Z-axis. That is, the Coriolis force (force de Coriolis) corresponding to the vibration is generated in the Y-axis direction of second arm 4. At the same time, distortion occurs in the Z-axis direction of facing portion 16 of second arm 4 due to an angular velocity about the Y-axis. Similarly, the Coriolis force corresponding to the vibration is generated in the Z-axis direction of second arm 4. Therefore, it is possible to detect the angular velocity of detecting element 1 by detecting at least one of the distortion of second arm 4 in the X-axis direction and the distortion thereof in the Z-axis direction. For example, facing portion 16 is alternately vibrated in the X-axis direction as represented by arrow 62 including a solid line and a dotted line in FIG. 4.

In particular, driving electrodes 18 are provided in two facing portions 16 that are arranged at one side of second arms 4 facing each other, and detection electrodes 20 are provided in two facing portions 16 that are arranged at the other side of second arms 4. In this way, it is possible to reduce the number of vibrations, which is a resonant frequency, and easily design a circuit (not shown) for operating driving electrodes 18. In addition, detection accuracy is improved. That is, for example, when driving electrode 18 is provided in second arm 4 in the vicinity of support portion 6, it is difficult to lower the resonant frequency and the above-mentioned effects are not obtained. In addition, detecting element 1 having the above-mentioned structure can prevent signal interference between signal lines 56 connected to driving electrodes 18 and signal lines 58 connected to detection electrodes 20. In this way, the detection accuracy of inertial force sensor 50 is improved.

For example, when the angular velocity about the Z-axis (direction represented by arrow 66) is generated, as shown in FIG. 4, the Coriolis force is generated in a direction that is orthogonal to the X-axis direction, which is the vibration direction, and is tuned with the vibration in the direction of arrow 62. That is, the Coriolis force is tuned with the frequency of the vibration in the direction of arrow 62, and is generated in the direction of arrow 64 represented by a solid line and a dotted line. When the angular velocity counterclockwise about the Z-axis represented by arrow 66 is generated, first detection electrode 22 and third detection electrode 26 detect the expansion of facing portion 16, and second detection electrode 24 and fourth detection electrode 28 detect the contraction of facing portion 16. When an angular velocity clockwise about the Z-axis is generated in a direction that is opposite to arrow 66, first detection electrode 22 and third detection electrode 26 detect the contraction of facing portion 16, and second detection electrode 24 and fourth detection electrode 28 detect the expansion of facing portion 16. Meanwhile, second arms 4 having driving electrodes 18 provided therein are operated symmetrically with respect to second arms 4 having detection electrodes 20 provided therein, in synchronization with the operation of second arms 4 having detection electrodes 20 provided therein.

Similarly about the acceleration, for example, first arm 2 is distorted due to acceleration in the Y-axis direction. This is because force caused by weight of second arms 4 is applied to first arm 2. At the same time, third arm 10 is distorted due to the acceleration in the X-axis direction. This is because force caused by weight of first arm 2 and the weight of second arms 4 is applied to third arm 10. Therefore, the distortion occurring in at least one of first arm 2 and third arm 10 is detected, and thus the acceleration of detecting element 1 is detected.

In particular, as shown in FIG. 3, thickness t2 of first arm 2 is smaller than thickness t of second arm 4 and third arm 10. In addition, thin film resistor 42 is laminated on first arm 2 and detection electrode 30 for detecting the acceleration is formed on thin film resistor 42. In this way, first arm 2 is likely to be distorted, and is very sensitive to distortion due to the acceleration in the Y-axis direction. Therefore, the detection sensitivity of the acceleration is improved.

In this way, a plurality of different inertial forces applied to detecting element 1 is detected. In addition, inertial forces applied to a plurality of different detection axes of detecting element 1 are detected. Therefore, the area for mounting is reduced, and it is possible to achieve detecting element 1 having a small mounting area and a small size.

Furthermore, in detecting element 1 according to the embodiment of the invention, second arm 4 is bent at bent portion 4a. Therefore, each of second arms 4 includes facing portion 16 facing second arms 4 each other. In addition, facing portion 16 is vibrated so that amplitude of the vibration is larger. As a result, the detection sensitivity of the angular velocity is improved.

Weight 14 is formed at end portion 4b of each of second arms 4. The mass effect of weight 14 increases the amplitude of vibrated end portion 4b, and the detection sensitivity of the angular velocity is improved. Since a product constant (mass×movement speed) is increased by weight 14, the Coriolis force generated by vibration increases, and thereby, these effects are obtained. In addition, a formation of weight 14 makes it possible to improve the detection sensitivity of the acceleration.

Further, since second arm 4 is bent at bent portion 4a, it is possible to achieve detecting element 1 having a small mounting area and a small size. In addition, a substantial distance between end portion 4b of second arm 4 to be vibrated and fixing portion 12 to which detecting element 1 is fixed is increased. In this way, the detection sensitivity of the angular velocity and the acceleration in all directions is improved. Therefore, it is possible to detect a plurality of the different angular velocities and accelerations with high sensitivity using small detecting element 1.

Figure 5:
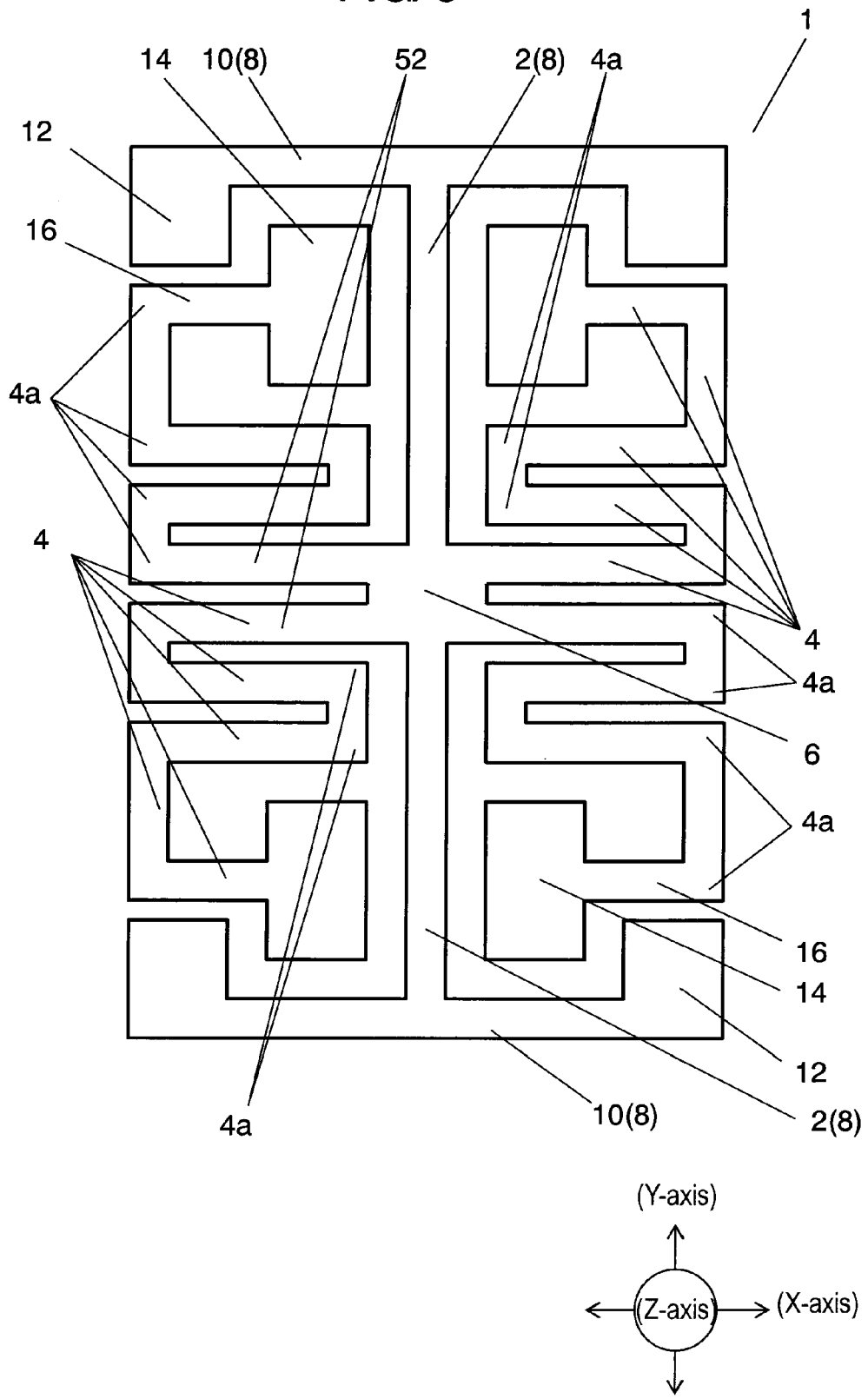
FIG. 5 is a perspective view illustrating a detecting element used in an inertial force sensor according to another embodiment of the invention.

Furthermore, as shown in FIG. 5, second arm 4 may be bent at a plurality of bent portions 4a in a meander shape such that end portion 4b faces second arm 4. When detecting element 1 has this structure, a substantial distance between end portion 4b of second arm 4 to be vibrated and fixing portion 12 to which detecting element 1 is fixed is increased. In this way, similar operations and effects as described above are further improved. Therefore, it is possible to achieve detecting element 1 having a small mounting area, a small size, and high sensitivity.

Figure 6:
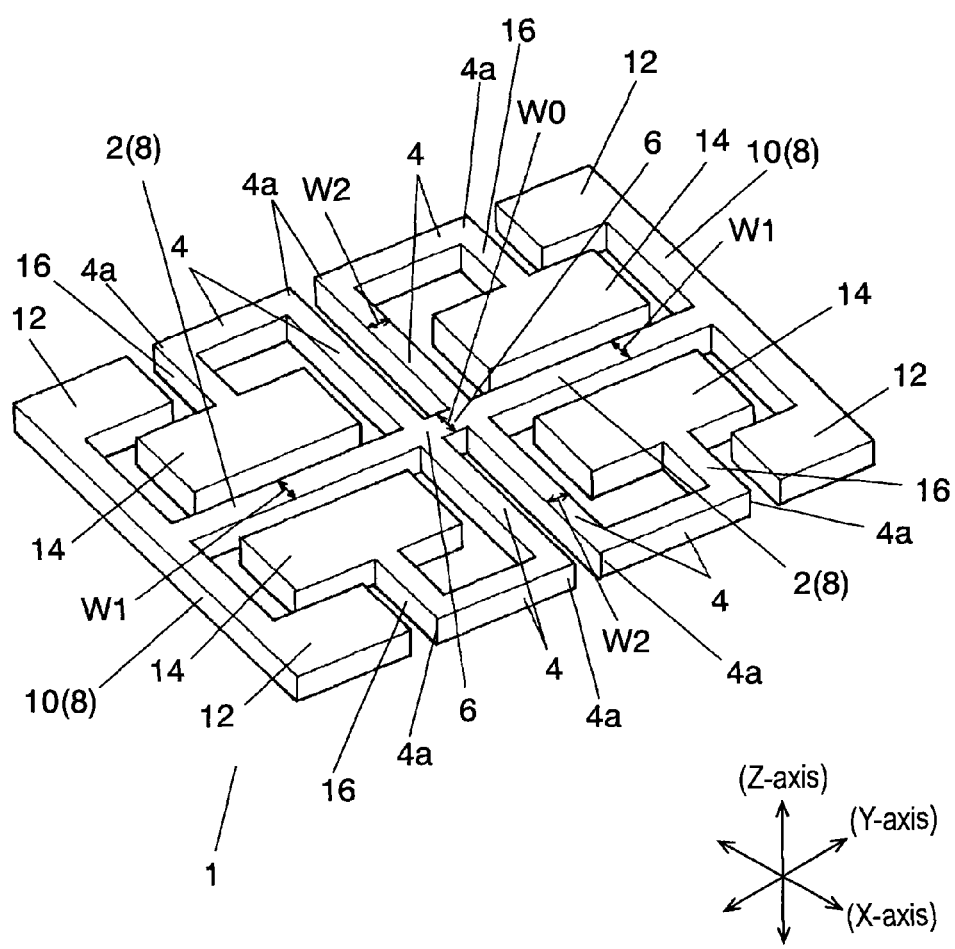
FIG. 6 is a perspective view illustrating a detecting element used in an inertial force sensor according to still another embodiment of the invention.

Moreover, as shown in FIG. 1, width W0 of support portion 6 may be larger than width W1 of first arm 2 and width W2 of second arm 4 (W0>W1>W2). In addition, as shown in FIG. 6, width W0 of support portion 6 may be equal to width W1 of first arm 2 and width W2 of second arm 4 (W0=W1=W2).

INDUSTRIAL APPLICABILITY

The inertial force sensor according to the invention can detect a plurality of inertial forces and inertial forces acting on a plurality of detection axes. Therefore, the inertial force sensor can be applied to various electronic apparatuses.

The invention claimed is:

1. An inertial force sensor comprising:
a detecting element that detects an inertial force,
the detecting element including:
two first orthogonal arms, each of the two first orthogonal arms having a first arm and a second arm that are connected to each other in a substantially orthogonal direction;
a support portion that supports the two first arms;
a fixing arm having one end connected to the support portion and the other end to which a mounting substrate having the detecting element mounted thereon is fixed, at least a portion of the fixing arm serving as the first arm, each of the two first orthogonal arms having the fixing arm; and a weight that is formed at an end of the second arm, and wherein the second arm includes:

a bent portion where the second arm is bent;

a facing portion formed by bending the second arm at the bent portion, the facing portion being located between the weights and the bent portion;

driving electrodes that are formed at two of the facing portions provided in a same direction with reference to the support portion, and drive and vibrate the two facing portions; and detection electrodes that are formed at another two of the facing portions which are opposite to the two facing portions having the driving electrodes with reference to the support portion, and detect distortion of the another two facing portions.

2. The inertial force sensor of claim 1, wherein the two first arms and the support portion are arranged on substantially a same straight line.

3. The inertial force sensor of claim 1,
wherein the fixing arm is a second orthogonal arm that is formed by connecting the first arm and a third arm in a substantially orthogonal direction, and
the mounting substrate is fixed to an end of the third arm.

4. The inertial force sensor of claim 1,
wherein the detection electrode denotes a first detection electrode, a second detection electrode, a third detection electrode, or a fourth detection electrode,
wherein in the another two facing portions having the detection electrodes,
the first detection electrode and the second detection electrode are arranged so as to face each other at one of the another two facing portions, and
the third detection electrode and the fourth detection electrode are arranged so as to face each other at the other of the another two facing portions.

5. The inertial force sensor of claim 3, wherein acceleration is detected by detecting distortion of the first arm or distortion of the third arm.

6. The inertial force sensor of claim 1, wherein a thickness of the first arm is smaller than a thickness of the second arm.

* * * * *